Jan. 23, 1968 G. MELCHIOR 3,365,541

COLOUR TELEVISION SYSTEMS USING AT LEAST ONE FREQUENCY-MODULATED SUBCARRIER

Filed June 17, 1963

3 Sheets-Sheet 1

INVENTOR

GÉRARD MELCHIOR

By Kurt Kelman

AGENT

INVENTOR
GÉRARD MELCHIOR
By Kurt Kelman
Agent

INVENTOR

GÉRARD MELCHIOR

By Kurt Kelman
agent

United States Patent Office 3,365,541
Patented Jan. 23, 1968

3,365,541

COLOUR TELEVISION SYSTEMS USING AT LEAST ONE FREQUENCY-MODULATED SUBCARRIER

Gerard Melchior, Levallois-Perret, France, assignor to Compagnie Francaise de Television, a corporation of France Filed June 17, 1963, Ser. No. 288,560
Claims priority, application France, June 18, 1962, 901,089; June 10, 1963, 937,521
15 Claims. (Cl. 178—5.2)

The present invention relates to colour television systems. More particularly the invention relates to colour television systems wherein the complex video signal modulating the carrier wave comprises a first wide-band picture signal, which can be used by black and white receivers, and at least one subcarrier, which is frequency modulated by a second picture signal.

One known method for protecting from noise a signal which is frequency-modulated on a wave consists in using a pre-emphasis filter at the transmitting end and a corresponding de-emphasis filter at the receiving end. The pre-emphasis filter entrances the higher frequencies of the modulating signal with respect to its lower frequencies. The characteristic of the de-emphasis filter is inverse of that of the pre-emphasis filter, and it receives the signal obtained through demodulating the frequency-modulated wave. Where a colour television subcarrier is concerned, this method involves, for a satisfactory degree of protection from noise and a correct restitution of the transmitted signal, such a widening of the frequency band of the subcarrier transmitting channel, that it becomes unpracticable.

In order to avoid this drawback, another method of protection from noise has been proposed. According to this method a first filter reinforcing the lateral frequencies at the subcarrier with respect to its central frequencies is provided at the transmitting end while a filter whose characteristic is inverse is used at the receiving end. These two filters are respectively designated, for short, as the "encoding filter" and the "decoding filter." By central frequencies are meant the frequencies in the vicinity of the resting frequency of the subcarrier, the latter corresponding to a zero level of the modulating signal; by lateral frequencies are meant the frequencies which are more remote from the resting frequency.

Experiments have shown that this second method affords a protection from noise which compares favourably with that obtained by the first method, and this without any widening of the bandwidth of the subcarrier transmitting channel.

However, this latter system has a drawback, in so far as the compatibility is concerned. It is known that, in compatible systems using a colour subcarrier, whose spectrum is situated in the band occupied by the signal which modulates the carrier directly, and which is used in black-and-white receivers, which signal is preferably the luminance signals, the modulated subcarrier introduces spurious patterns in the black-and-white picture. These patterns are liable to cause optical effects, known as "subcarrier visibility".

A similar effect also appears in colour receivers which use also the signal which modulates the carrier directly, since it is impossible to collect the whole of this signal without also collecting the unmodulated subcarrier.

Now, the modification suffered by the spectrum of the modulated subcarrier in the encoding filter cause amplitude and phase modulation which are superimposed on the original frequency modulation of the subcarrier. These modulations in amplitude and phase, depend, ultimately, for a given encoding filter, on the modulating signal, hence on the colour content of the picture to be reproduced. Experience has shown that, for certain modulating signal structures, e.g. when the subcarrier level is reinforced over a wide picture area, the amplitude modulation present on the subcarrier may cause the latter to be especially disturbing in so far as the visibility of the subcarrier is concerned.

In the case of the "Secam" (registered trademark) system, in which the frequency modulated wave is sequentially modulated by two different colour signals, which alternate at the line frequency, the spurious structures due to the subcarrier result, over uniform areas, in a streaky aspect due to the alternation of the two colour signals, this streaky aspect tending to catch the viewer's eye.

For the purpose of simplification, such a filter, whose amplitude-frequency characteristic is of the same type as that of a decoding filter, as previously defined, will hereafter be designated "decoding filter" even when not associated with an "encoding" filter whose amplitude-frequency characteristic is the inverse of its own.

It is an object of the invention to avoid such drawbacks. To this end, the invention provides a colour television system of the above-mentioned type, wherein a new method is applied for protecting from noise the signal transmitted by means of the subcarrier, without unduly widening the frequency bandwidth of the subcarrier transmitting channel or noticeably distorting the transmitted signal, while avoiding the above mentioned drawback in so far as compatibility is concerned.

According to the invention, there is provided a colour television system of the type wherein the complex video signal modulating the carrier comprises a first wide-band picture signal, which can be used by black and white receivers, and at least one subcarrier wave which is frequency modulated by another picture signal, said system comprising: at the receiving end, in the subcarrier channel, a decoding filter, whose amplitude-frequency characteristic shows a maximum for the resting frequency of the subcarrier and decreases on both sides thereof, so that from the sole utilization of said decoding filter results a frequency interval, centered on said resting frequency, which is effectively protected from noise; at the transmitting end, pre-emphasis means for lowering the amplitude of the lower frequencies of the signal to be transmitted by means of said subcarrier with respect to its higher frequencies, so that the instantaneous frequency of said subcarrier wave is included, for the most of the time, in said protected frequency interval; corresponding de-emphasis means in the receiver; means for eliminating the amplitude modulation of said subcarrier wave at the receiving end before frequency discriminating said subcarrier; and means in said transmitter for precorrecting the phase distortion imparted to said subcarrier wave by said decoding filter, while transmitting said subcarrier wave with an amplitude modulation which is not the reverse of the amplitude modulation imparted thereto by said decoding filter. The invention will be better understood and other characteristics thereof will become apparent by means of the following description and drawings in which:

FIGS. 1*a* and 1*b* are respectively the circuit diagrams of a transmitter and of receiver according to the invention;

FIGS. 2*a* and 2*b* are the amplitude-frequency characteristics of the emphasis and de-emphasis filters used in the circuits of FIGS. 1*a* and 1*b*;

FIGS. 3*a* and 3*b* are the amplitude-frequency characteristics of the encoding and decoding filters used respectively in the circuits of FIGS. 1*a* and 1*b*;

FIGS. 4*a* and 4*b* are the circuit diagrams of filters which may be used for securing the characteristics of FIGS. 3*a* and 3*b*;

The invention will be described, without being restricted thereto, in the case of its application to a method of realization of the Secam (registered trademark) colour television system. It is known that in this system the transmitter transmits a carrier wave modulated, on the one hand, by a wide band luminance signal Y and on the other hand by a subcarrier alternately modulated at the line frequency, by two colour signals A1 and A2 of narrower bandwith, which are preferably respectively proportional to $R-Y$ and $B-Y$, where R, B and G being the red, blue and green signals supplied by the cameras and gamma corrected, $$Y=0.59G+0.30R+0.11B$$

At the receiver, the sequential signals A1 and A2 are repeated by means of a delay system so that they shall become simultaneous.

Figure 1:
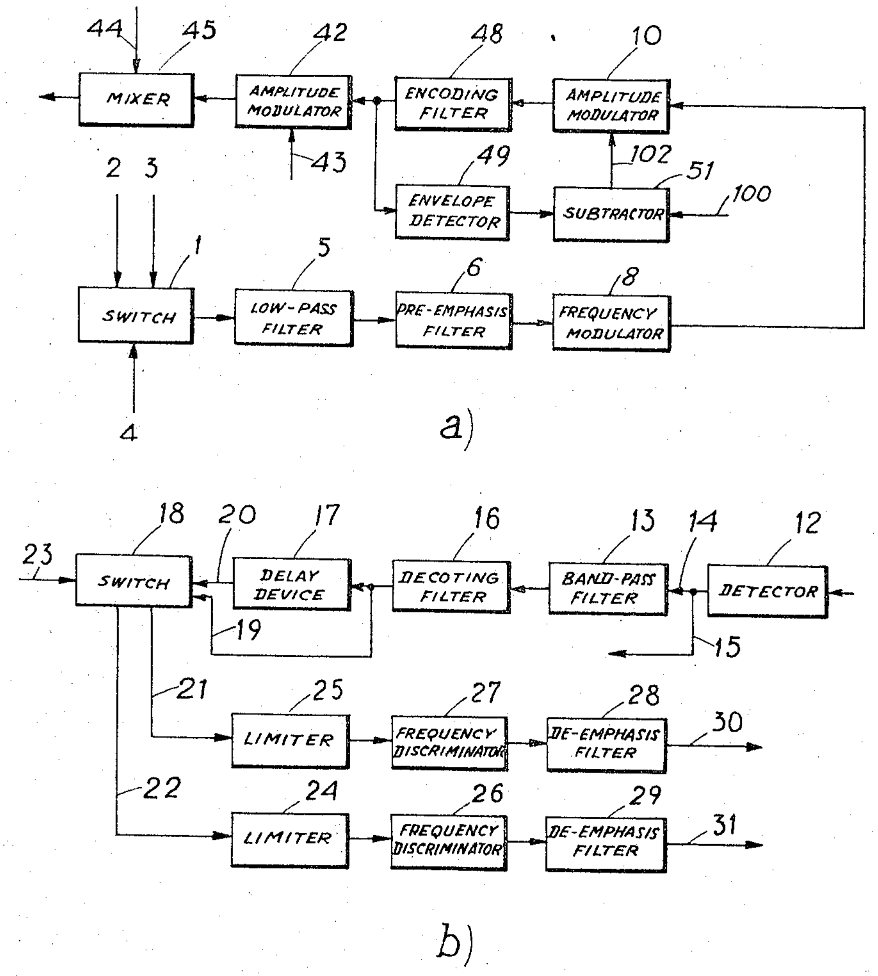

FIG. 1*a* shows a part of a corresponding transmitter circuit. In FIG. 1*a*, a switch 1 has two signal inputs 2 and 3, a control input 4 and an output.

Inputs 2 and 3 receive the two colour signals A1 and A2, obtained by means of a matrix from the colour signals R (red), B (blue) and G (green), supplied by the cameras and gamma corrected.

Input 4 receives a signal which actuates the switch regularly at the line frequency at least during the active frame durations.

By active frame duration is meant the time interval between two vertical blanking intervals, the active line duration being similarly defined as the time interval between two horizontal blanking intervals.

Henceforth, the time intervals during which picture signals in the strict sense of the term are transmitted, i.e. the active line durations within the active frame durations, will be referred to as "active intervals."

During a part of each vertical blanking interval, designated as "control period," inputs 2 and 3 each receive signals, designated as "identification signals" for phasing the transmission and reception switches, as shown in the patent application, Ser. No. 270,464, for "Improvements to colour television systems," filed Apr. 3, 1963, and assigned to the same assignee.

These identification signals suffer the same transformation at the transmitter and receiver as the picture signals A1 and A2 and, since they have no effect on carrier visibility they will not be mentioned further.

During the active intervals, switch 1 alternately supplies signal A1 and signal A2.

Switch 1 feeds a low-pass filter 5 which reduces the bandwith of the signals passing therethrough with respect to that of the luminance signal.

Low-pass filter 5 feeds a pre-emphasis filter 6 which attenuates the lower frequencies of signals A1 and A2 as compared to their higher frequencies.

The output of filter 6 is connected to a frequency modulator 8 of the modulated oscillator type. It will first be assumed to simplify the description that it does not impart any amplitude modulation to the frequency modulated wave which it supplies, and, for example, comprises to that end an output limiter.

Frequency modulator 8 thus supplies the subcarrier with a constant amplitude and alternately frequency modulated, during the active intervals, by signals A1 and A2.

The output of frequency modulator 8 is coupled to the first input of an amplitude modulator 10 of a type not imparting phase distortion.

The output of amplitude modulator 10 is connected to the input of an encoding filter 48, of the above mentioned type, whose output is coupled, through a feedback path, to a second input 102 of the amplitude modulator 10, input 102 being the modulation input thereof.

This feedback path comprises an envelope detector 49 and a subtractor 51, whose first input 100, receives a reference signal, whose second input is connected to the output of envelope detector 49, and whose output is coupled to the input 102 of amplitude modulator 10.

The subcarrier supplied by frequency modulator 8 is amplitude modulated by amplitude modulator 10, as will be explained hereinbelow, and is then applied to the encoding filter 48 whose action on its input signal may be considered as an amplitude modulation superimposed on that which is impressed by the amplitude modulator 10, and a phase modulation superimposed on the frequency modulation imparted by the frequency modulator 8.

The output signal of filter 48 is detected in envelope detector 49, and compared, in subtractor 51, to the reference signal. It will first be assumed that this reference signal has a constant level corresponding to the desired constant amplitude of the output signal of filter 48. The output signal of subtractor 51 thus constitutes an error signal, which, suitably applied to input 102, ensures the desired result, i.e. a constant amplitude at a desired level of the subcarrier wave supplied by filter 48.

The advantage of such a circuit for obtaining the constant amplitude subcarrier at the output of filter 48 will appear when the corresponding receiving circuit of FIG. 1*b* is described.

On the other hand, it will now appear that, with such a circuit, an output limiter may be dispensed with in frequency modulator 8, since any amplitude modulation imparted by this modulator will be eliminated in the feedback circuit 10–48.

FIG. 1*a* shows an amplitude modulator 42 which is used for suppressing the subcarrier in the course of the blanking intervals, as indicated in the above mentioned patent application. To this end, modulator 42 receives at its modulation input 43, a modulating signal consisting of square pulses covering the time intervals during which the subcarrier has to be suppressed. This is a modulation by all or nothing which does not modify anything during the transmission of signals.

Modulator 42 feeds one of the inputs of a mixer 45 which receives at its second input 44 the signals which modulate the carrier directly, i.e. the luminance signal and the synchronizing signals.

The mixer output 45 feeds the carrier modulating circuits.

FIG. 1*b* shows in part one method of realizing the corresponding receiver.

In this figure, 12 is the detector which receives at its input the carrier brought to the intermediate frequency, and having a first output 15 supplying the luminance signal and the synchronizing signals, and a second output 14 feeding a band-pass filter 13 which supplies the modulated subcarrier.

The conventional circuits fed from output 15 and supplying the scanning signals and the luminance signal Y are not shown in the figure.

Filter 13 feeds a decoding filter 16 whose transmission characteristic is the inverse of that of the encoding filter 10.

It must be stated at this stage that, when saying that two transmission filters have two transmission characteristics which are inverse one with respect to the other, it is meant that these two filters are complementary, i.e. the arrangement obtained by connecting these two filters in series causes no signal distortion. This requires that the product of the gains, respectively imposed by the two filters, for the same frequency of the frequency interval under consideration, is constant, and that the sum of the phase-shifts respectively imposed by the two filters, for the same frequency, is proportional to the frequency under consideration, or is zero. This requirement for the filters is also applicable as concerns the pre-emphasis and de-emphasis process.

In order to avoid any delay on the signal, which would have to be corrected, it is preferable that the sum of the phase shifts should be zero rather than proportional to frequency.

The signal applied to input of the decoding filter is, disregarding the noise introduced in the transmission, the same which appeared at the output of modulator 42 of FIG. 1*a*, which signal is identical to that supplied by filter 48 outside of the time intervals wherein the subcarrier is suppressed.

Filter 16 being complementary of filter 48 and its input signal being the same as the output signal of filter 48, the phase modulation which it impresses perfectly compensate that which had been impressed by filter 16, and the frequency-modulated subcarrier which it supplies is no longer phase distorted.

The advantage now appears clearly of the circuit used at the transmitting end to bring the amplitude of the transmitted subcarrier to a constant level.

Filter 16 feeds the two inputs of a switch 18 one directly and the other through a delay system 17 which imposes on the signals propagating through it, a delay whose duration is equal to the reciprocal of the line frequency.

Double switch 18 receives respectively at its input 19 the subcarrier modulated by the sequential signals A1 and A2, and at its input 20 the corresponding delayed signals, i.e. the subcarrier modulated by A'2, (the delayed signal A2 applied simultaneously with a signal A1) and A'1 (the delayed signal A1 applied simultaneously with a signal A2).

During the active frame periods, it is actuated in synchronism with the transmission switch 1 by signals applied at line frequency to its control inputs shown diagrammaticaly by the single input 23.

Switch 18 is so connected as to supply at its output 21 the subcarrier modulated by signals A1 and A'1, henceforth designated as signals A1, and at its output 22, the subcarrier modulated by signals A2 and A'2, henceforth designated as signals A2.

Outputs 21 and 22 feed respectively limiters 25 and 24, respectively followed by frequency discriminators 27 and 26 and identical de-emphasis filters 28 and 29 which are complementary of the pre-emphasis filter 6.

After having passed through limiters 25 and 24, the subcarrier has a constant amplitude. It is thus correctly detected by discriminators 27 and 26, which respectively restitute during the active periods the modulating signals corresponding to A1 and A2.

It should be noted that if, as indicated in the above mentioned copending patent application, one of the signals A1 or A2 is proportional to $R-Y$ or to $B-Y$ with a negative coefficient, the corresponding discriminator preferably reverses the polarity of the modulating signal.

De-emphasis filters 28 and 29 finally restitute at outputs 30 and 31 the signals A1 and A2 with a possible reversal of the polarity of one of them.

These signals are used to produces signals $R-Y$, $G-Y$ and $B-Y$ which combined with the wide-band signal Y to feed the picture reproduction component.

The improvement obtained, insofar as subcarrier visibility is concerned may be explained as follows:

The modulated subcarrier which appears on the black-and white receiver screen, or which affects the luminance signal in colour television receivers, is, disregarding noise, that which appears at the output of transmitter modulator 42.

As the latter modifies the subcarrier amplitude only during the frame and line blanking periods, the subcarrier which appears at the output of modulator 42 is not amplitude modulated during the active periods.

The above mentioned streaky structure defect this disappears completely.

There remains to explain the protection obtained as to noise, and in doing so to define the method used for applying pre-emphasis combined with intensification of the central frequencies of the subcarrier at the receiver.

Reference will first be made to the amplitude-frequency diagram of decoding filter 16, shown in FIG. 3*b*.

In this diagram, frequencies *f* are plotted as abscissae in the frequency intervals F3–F4 corresponding to the bandwith of the subcarrier channel. F*o* is the resting frequency, i.e. the frequency of the modulated wave for zero level of the modulating signal. The interval F1–F2 corresponds to the frequency swing.

The relative gain G is plotted as ordinates, i.e. the ratio output amplitude/input amplitude, imposed by the filter as a function of frequency. The curve is symmetrical about the vertical axis of abscissa F*o*.

It being understood that these explanations are given only as general information, and can in no way restrict the coverage of the invention, the matter may be considered as follows:

First a signal is considered consisting of a pure frequency F*o* or very nearly equal to it. Protection from noise, obtained from the mere use of the decoding filter, is apparent when the gain at frequency F*o* is taken as unity gain (since this is a matter of relative magnitudes this assumption has no adverse effect on the generalization); noise is weakened at all frequencies except F*o* while the signal is not.

The resulting advantage for a given frequency exists over a certain frequency interval, symmetrical about F*o*, while decreasing as the difference from F*o* increases, since the amplitude of the signal becomes increasingly weakened.

It may be taken that this advantage remains within an interval I*r*, symmetrical about F*o*, and beyond which this advantage will become a drawback.

Thus the noise protection so obtained will certainly be satisfactory if this interval I*r* covers the whole of the interval F1–F2.

A first solution is thus apparent. It consists in using, at the receiver, a decoding filter strongly, and practically uniformly advantaging all the frequencies in the frequency interval F1–F2 (taking an "ideal" filter there would be a two-level curve, i.e. an upper level in the interval F1–F2 and two lower levels on either side of this upper level).

This solution is useful only in the case when the bandwidth F3–F4 of the transmission channel is much greater than the frequency excursion F1–F2. It is of little value in the case of this method of realization, i.e. if F1–F2 covers the greater part of the total interval F3–F4. For in this case protection from noise is far too slight.

Therefore, according to the invention, the use of a decoding filter at the receiver is combined with a pre-emphasis, which is not designed to improve by itself alone the signal/noise ratio (which as mentioned above, would involve an unacceptable widening of the bandwidth or unacceptable signal distortion). For the pre-emphasis used in this present case is not a conventional pre-emphasis with the object of increasing the amplitude of the higher frequencies of the signal to be transmitted. Its object is to reduce the amplitude of the lower frequencies of the colour video signal to be transmitted, and this with a view to inserting, for the greater part of the time, the instantaneous frequency of the subcarrier in the interval I*r* defined above in connection with the curve of FIG. 3*b*, as, as is well known, the greater part of the energy of the signal is, for most of the time, contained in the lower portion of its spectrum.

In this way the pre-emphasis applied in this case requires no widening of the range of the modulating signal levels with respect to that which is necessary in the absence of pre-emphasis. Such is not the case with a conventional type of pre-emphasis of television video signals.

Figures 2, 3:
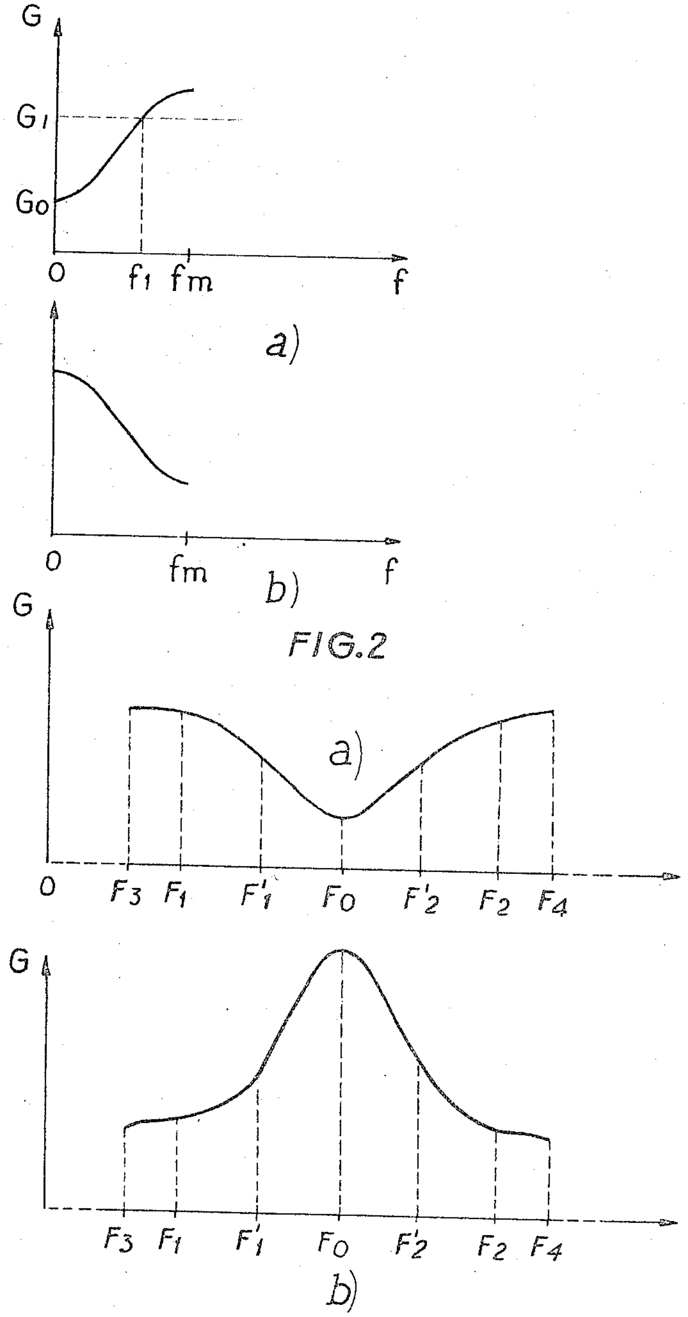

Pre-emphasis may be applied in accordance with the curve of FIG. 2*a*, where the video frequencies are plotted along the abscissae and the gain G as ordinates (output amplitude/input amplitude).

In this figure *fm* is the maximum video frequency to be transmitted. The frequency *fl* corresponds to the limit between the frequencies whose amplitudes are relatively lowered by pre-emphasis and the frequencies whose amplitudes are relatively increased by pre-emphasis; G*l* is the corresponding gain, i.e. *l* (it is of course assumed that the filter is associated with an amplifier).

As an example, for a band-width *fm* of the video signal to be transmitted equal to 1 mc./s., *fl* may be taken at about 700 kc./s., and the ratio G*l*/G*o*, where G*o* is the gain for the very low frequencies, about 3.

Experience has shown that under these conditions the instantaneous frequency is mostly found in the central region of the interval F'1–F'2 (shown in FIG. 3*b* and corresponding to an attenuation of 1/2 in absolute value with respect to the maximum of the curve of FIG. 3*b*) and that, when the instantaneous frequency extends beyond this zone, it does so only for very limited periods. Protection from noise is thus quite satisfactory.

On this point, stress has to be laid on the fact that the known process, using at the receiver a decoding filter, associated with an encoding filter whose action on the amplitude remains unaffected improves the signal-to-noise ratio, before the limiter which precedes the discriminator, for the lateral frequencies only due the increase of the amplitudes to which these frequencies are subjected in the encoding filter.

The improvement to the signal-to-noise ratio obtained in this way through the combined coding and decoding operations, is then present over the whole width of the transmission band. However, this method is liable to introduce a serious drawback from the viewpoint of compatibility, as mentioned earlier.

The use at the receiver of a decoding filter, $\theta$ without an encoding filter being used at the transmitter, or with a device which suppresses the amplitude modulation of the subcarrier introduced by the encoding filter also has some effect on the signal-to-noise ratio before the limiter which precedes the discriminator. But in this case the effect is selective. Very good for the most central frequencies—those which are most raised at the receiver—it becomes gradually less so and finally disadvantages the lateral frequencies. But on the other hand, as compared to the previous one, this process has the advantage of being far superior from the point of view of compatibility.

There remained the need to improve the latter process, by introducing in the band protected, in the course of the decoding process, the instantaneous frequencies of the carrier for most of the time, without excessive widening of the band of frequencies emphasized by the decoding filter, since the protection obtained for the protected frequencies during the decoding is all the better as this bandwidth is smaller with respect to the total width of the transmission channel.

This result is achieved by attenuating the lower frequencies of the signal to be transmitted; in this way, the instantaneous frequency of the modulated wave is, for most of the time, kept within a narrow frequency band.

The characteristic of FIG. 2*b* is a characteristic inverse of that of FIG. 2*a* (amplitude-frequency characteristic).

The curve of FIG. 3*a* is a characteristic inverse of that of FIG. 3*b* (amplitude-frequency characteristic).

FIGS. 4*a* and 4*b* show respectively simple filters which can be used to secure characteristics of the types of FIGS. 3*a* and 3*b*.

The decoding filter of FIG. 4*b* is intended to be fed from a voltage source of zero internal impedance and consists of two input terminals E3 and E4 connected in series by a resistance R3, a parallel resonant circuit consisting of an inductance coil L2 and a capacitor C2, and a resistance R4. The output voltage is taken between terminal S4, connected to E4 and terminal S3, connected to the point common to R3 and to the parallel circuit L2–C2. The product L2, C2 is so chosen that the parallel circuit resonates at frequency F*o*, and the ratio *L2/C2* and resistances R3 and R4 are adjusted to secure the desired attenuation curve on either side of frequency F*o*.

The filter of FIG. 4*a*, also intended to be fed from a voltage source, has two input terminals E1 and E2 connected in series by a resistance R1, an inductance coil L1, a capacitor C1 and a resistance R2. The output voltage is taken between terminal S2, connected to E2, and terminal S1, connected to the point common to R1 and L1.

The product *L1.C1* is selected to secure resonance at frequency F*o*; the ratio *L1/C1* and resistances R1 and R2 are so adjusted as to secure the amplitude-frequency curve inverse of the former. Under these conditions for the filters under consideration, the transmission characteristics are mutually inverse.

It has been indicated above that it was preferable that the sum of the phase-shifts imparted by the two complementary filters should be zero rather than proportional to the frequency.

Figure 4:
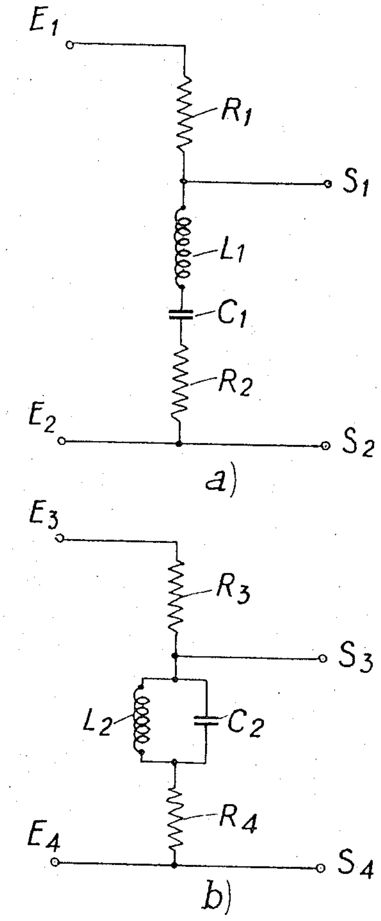

Such is the case for the two filters of FIG. 4.

It should be noted that bringing to a constant amplitude the output signal of filter 48 of FIG. 1*a* may involve some widening of the bandwidth of the subcarrier transmitting channel. This widening is much less than that which would be involved by a conventional pre-emphasis of the modulating signal, i.e. a pre-emphasis affording by its sole action a satisfactory protection from noise. This widening may, however, be eliminated, or at least considerably reduced, through inserting a low-pass filter between envelope detector 49 and subtractor 51, or, preferably between subtractor 51 and input 102 of amplitude modulator 10 of FIG. 1*a*. In this case only the lower frequency components of the amplitude modulation of the output signal of filter 48 will be eliminated, but experience has shown that those are practically the only troublesome components insofar as compatibility is concerned.

On the other hand, the output signal of filter 48 may be brought to a constant amplitude by means of a conventional negative feedback.

Figure 5:
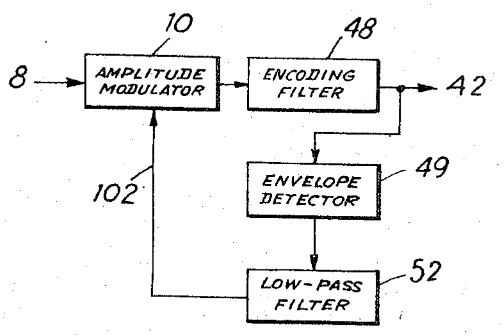
FIG. 5 illustrates a variation of the circuit of FIG. 1*a*.

FIG. 5 shows a variation of the circuit of FIG. 1*a* wherein only the lower frequency components of the amplitude modulation are eliminated, this being done by means of a negative feedback path including a low-pass filter.

In this figure, where only the modified part of the circuit FIG. 1*a* has been illustrated, amplitude modulator 10 and encoding filter 48 are shown again, the path connecting the output of the latter to the input modulation 102 of the former including an envelope detector 49, followed by a low-pass filter 52. It suffices to use a high degree of negative feedback to obtain the desired result, i.e. that the amplitude modulation of the output signal of filter 48 should have no components at the frequencies corresponding to the pass-band of filter 52.

Of course, through removing filter 52, the circuit may also be used to suppress any amplitude modulation in the output signal of filter 48.

So far, the case has been considered where the subcarrier was transmitted without amplitude modulation (disregarding the modulation by all or nothing during the blanking intervals), at least as concerns the lower-frequency components.

In fact, in particular as concerns the Secam (registered trademark) system, it may be advantageous to impress thereon an amplitude modulation which, of course, is chosen so as not to impair compatibility.

Such an amplitude modulation of the subcarrier has been described in the U.S. patent application, Ser. No. 276,013 for "Improvements in Colour Television Transmitters," filed Apr. 26, 1963, and assigned to the same assignee.

This amplitude modulation of the subcarrier is effected as a function of the level of the signal built up by those of the spectral frequencies of the luminance signal which are within the frequency band covered by the modulated subcarrier in order to afford a good protection of the subcarrier from any possible interference from the luminance signal.

Such an amplitude modulation does not affect the instantaneous frequency of the modulated subcarrier corresponding to a given level of the modulating signal and the advantage acquired through the combined action of the decoding filter and of the pre-emphasis filter thus remains. But to this action is added, without destroying it, the action resulting from the amplitude modulation which, as was said, is chosen so as not to impair compatibility to any practical degree.

Such is, besides, the case for any amplitude modulaton which may be substituted for the original amplitude modulation caused by the coding filter.

In the present example this modulation will not systematically depend on the colour content of the picture and will never depend on that of the sequential signals actually transmitted; it will therefore cause very little disturbance.

To impress on the subcarrier an auxiliary amplitude modulation of this type, it suffices, in the circuit of FIG. 1*a*, to substitute for the constant level signal, applied to input 100 of subtractor 51, the signal corresponding to the desired amplitude modulation, as filter 48 will then deliver a subcarrier which is amplitude modulated according to this signal.

Here again, and for the same reason, a low-pass filter may be inserted between subtractor 51 and the input 102 of modulator 10.

This applies whatever the desired amplitude modulation, and it is possible to resort to a modulation by the sum of two or more modulating signals.

It has been indicated that, by acting on the amplitude of the transmitted subcarrier by means of a feedback path between the output of encoding filter 48 and modulator 10, the latter preceding the encoding filter, the pre-correction of the phase distortion imparted by the receiver filter 16 was effected in the most favourable way, while the elaboration of the reference signal does not raise the problems which would arise for elaborating the modulating signal if a direct conventional modulation were used.

It is however possible to use simpler circuits, the phase correction being then less perfect.

Figure 6:
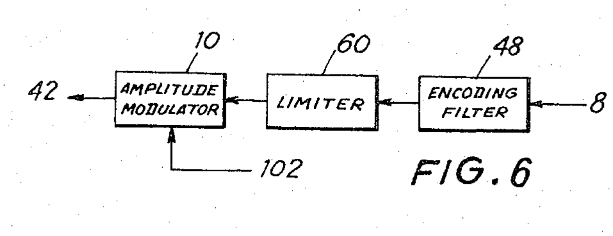
FIG. 6 illustrates another variation of the circuit of FIG. 1*a*.

By way of example, a simplified circuit of this type has been illustrated in FIG. 6, where only that part of the circuit which is modified relatively to the circuit of FIG. 1*a*, has been shown.

Encoding filter 48 is coupled to the output of frequency modulator 8, which may comprise or not an output limiter.

Encoding filter 48 is followed by a limiter 60 eliminating any amplitude modulation from the subcarrier.

If it is desired to impress a predetermined amplitude modulation on the subcarrier, the output of limiter 60 is coupled to the first input of modulator 10, whose modulation input 102 receives the signal corresponding to the desired amplitude modulation.

The output of modulator 10 is coupled to the input of modulator 42. It is possible to combine in a single modulator both modulators 10 and 42 through making the sum of the modulating signals.

If it is only desired to have a constant amplitude subcarrier, of course, then modulator 10 is unnecessary.

With a circuit of this type, the phase correction becomes less adequate as the instantaneous frequency is more removed from the resting frequency of the subcarrier, this drawback being however considerably reduced on account of the pre-emphasis effected in filter 6.

Naturally, the invention is not restricted to the embodiments described and shown.

It should be stressed in particular, that in the described method of realization the coding filter followed by the limiter is only a convenient arrangement for the purpose of pre-correcting phase distortion appearing at the receiver in the modulated wave through the action of the decoding filter, and that the use of any other arrangement inserted in the transmitter for pre-correction of this phase distortion, also falls within the scope of the invention.

Also, the application of the invention to a system using more than one frequency-modulated subcarrier is obviously possible by means of adaptations well within the reach of those skilled in the art.

It is to be understood that in the case of a modulated wave with asymmetrical side-bands, by central frequencies are meant frequencies near the resting frequency, i.e. that corresponding to the zero level of the modulating signal, of the subcarrier, and by lateral frequencies are meant those frequencies which are remote from the resting frequency.

The proposed steps concerning the amplitude of the subcarrier are advantageously combined with measures concerning its phase, but not modifying the latter in the course of active intervals and taking place, for example, before the amplitude modulator and the encoding filter.

In the case of the "Secam" (registered trademark) system, these measures may be as described in the copending patent application, Ser. No. 135,305, filed Aug. 31, 1961, for: "Improvements in Color Television Systems," and assigned to the same assignee.

What is claimed is:

1. A colour television system of the type wherein the transmitted complex video signal comprises a first wide-band picture signal, which can be used by black and white receivers, and at least one subcarrier wave which is frequency-modulated by a colour signal, said system comprising:

a transmitter comprising a colour channel including: pre-emphasis means having an input for receiving said colour signal and an output; a frequency modulator having a modulation input coupled to said pre-emphasis means output, and an output; and phase-pre-correcting means having an input coupled to said frequency modulator output;

and a receiver comprising a colour channel including: a receiver filter having an input for receiving said subcarrier, and an output, the amplitude-frequency characteristics of said receiver filter showing a maximum for a central frequency of the bandwidth of said subcarrier and continuously decreasing on both sides thereof, so that said amplitude-frequency characteristic defines a frequency interval, referred to as a "protected frequency interval," such that said receiver filter attenuates to a greater degree a noise signal having a uniform energy distribution within the bandwidth of said subcarrier than a wave having a frequency lying within said protected frequency interval; a limiter having an input coupled to the output of said receiver filter and an output; frequency discriminating means having an input coupled to said limiter output, and an output; and de-emphasis means having an input coupled to said frequency discriminating means output, and an output;

said pre-emphasis means being means for attenuating the lower frequency components of said colour signal relatively to its higher frequency components so that the instantaneous frequency of said subcarrier wave is included, for most of the time, in said protected frequency interval; said phase pre-correcting means being means for pre-correcting the phase distortion imparted to said subcarrier by said receiver filter; said de-emphasis means being means for compensating for the distortion imparted to said color signal by said pre-emphasis means.

2. A colour television transmitter of the type wherein the transmitted complex video signal comprises a first wide-band picture signal, which can be used by black and white receivers and at least one subcarrier which is frequency-modulated by another picture signal, said transmitter comprising a subcarrier channel including in series: a pre-emphasis filter for attenuating the lower frequencies of said other picture signal relatively to its higher frequencies, said filter delivering a pre-emphasized signal; means for frequency modulating said pre-emphasized signal on a subcarrier wave; and a further filter having a gain vs. frequency characteristic continuously increasing on both sides of a central frequency of the bandwidth of said transmitted subcarrier, for reinforcing the lateral frequencies of the frequency-modulated subcarrier with respect to its central frequencies; said pre-emphasis filter being a filter for attenuating the lower frequency components of said colour signal relatively to its higher frequency components so that the instantaneous frequency of said subcarrier is included, for most of the time, in a protected frequency-interval, defined as the frequency interval for which a filter, having an amplitude/frequency characteristic which is the reverse of that of said further filter, attenuates to a greater degree a noise signal having a uniform energy density within said bandwidth of said transmitted subcarrier than a wave having a frequency lying in said frequency interval.

3. A colour television transmitter as claimed in claim 2, wherein said signal transmitted by means of said subcarrier consists of two sequential colour signals alternating at the line frequency.

4. A colour television transmitter of the type wherein the transmitted complex video signal comprises a first wide-band picture signal, which can be used by black and white receivers and at least one subcarrier which is frequency-modulated by another picture signal, said transmitter comprising a subcarrier channel including in series: a pre-emphasis filter for attenuating the lower frequencies of said other picture signal relatively to its higher frequencies, said filter delivering a pre-emphasized signal; means for frequency modulating said pre-emphasized signal on a subcarrier wave; a further filter reinforcing the lateral frequencies of said frequency-modulated subcarrier wave relatively to its central frequencies, said further filter having an output; and a limiter having an input coupled to said output of said further filter.

5. A colour television transmitter of the type wherein the transmitted complex video signal comprises a first wide-band picture signal, which can be used by black and white receivers and at least one subcarrier which is frequency-modulated by another picture signal, said transmitter comprising a subcarrier channel including in series; a pre-emphasis filter for attenuating the lower frequencies of said other picture signal relatively to its higher frequencies, said filter delivering a pre-emphasized signal; means for frequency modulating said pre-emphasized signal on a subcarrier wave; a further filter reinforcing the lateral frequencies of said frequency-modulated subcarrier wave relatively to its central frequencies, said further filter having an output; a limiter having an input coupled to the output of said further filter and an output; an amplitude modulator having a first input coupled to the output of said limiter and a second input; and means for applying a modulating signal to said second input at least during a portion of the time corresponding to the transmission of picture signals.

6. A colour television transmitter of the type wherein the transmitted complex video signal comprises a first wide-band picture signal, which can be used by black and white receivers and at least one subcarrier which is frequency-modulated by another picture signal, said transmitter comprising a subcarrier channel including in series; a pre-emphasis filter for attenuating the lower frequencies of said other picture signal relatively to its higher frequencies, said filter delivering a pre-emphasized signal; means for frequency modulating said pre-emphasized signal on a subcarrier wave: an amplitude modulator having a subcarrier input coupled to said frequency modulator and a second input; a further filter reinforcing the lateral frequencies of said frequency-modulated subcarrier wave relatively to its central frequencies; the output of said further filter being coupled to said second input of said amplitude modulator by a feedback path.

7. A colour television transmitter of the type wherein the transmitted complex video signal comprises a first wide-band picture signal, which can be used by black and white receivers and at least one subcarrier which is frequency-modulated by another picture signal, said transmitter comprising a subcarrier channel including in series; a pre-emphasis filter for attenuating the lower frequencies of said other picture signal relatively to its higher frequencies, said filter delivering a pre-emphasized signal; means for frequency modulating said pre-emphasized signal on a subcarrier wave; an amplitude modulator having a subcarrier input coupled to said frequency modulator a second input and an output; a further filter reinforcing the lateral frequencies of said frequency-modulated subcarrier wave relatively to its central frequencies, said further filter having an input coupled to said output of said amplitude modulator, and an output; the output of said further filter being coupled to said second input of said amplitude modulator by a feedback path, said feedback path comprising: an envelope detector coupled to the output of said further filter, a subtractor having a first input coupled to the output of said envelope detector, and means for applying to the other input of said subtractor a reference signal with a fixed or a variable level, the output of said subtractor being coupled to said second input of said amplitude modulator.

8. A colour television transmitter as claimed in claim 7, wherein said signal transmitted by means of said subcarrier consists of two sequential colour signals alternating at the line frequency.

9. A colour television transmitter as claimed in claim 7, wherein a low-pass filter is inserted in said feedback path between said envelope detector and said subtractor.

10. A colour television transmitter as claimed in claim 7, wherein a low-pass filter is inserted in said feedback path between said snubtractor and said second input of said amplitude modulator.

11. A colour television transmitter of the type wherein the trnasmitted complex video signal comprises a first wide-band picture signal, which can be used by black and white receivers and at least one subcarrier which is frequency-modulated by another picture signal, said transmitter comprising a subcarrier channel including in series; a pre-emphasis filter for attenuating the lower frequencies of said other picture signal relatively to its higher frequencies, said filter delivering a pre-emphasized signal; means for frequency modulating said pre-emphasized signal on a subcarrier wave; an amplitude modulator having a subcarrier input coupled to said frequency modulator and second input; a further filter reinforcing the lateral frequencies of said frequency-modulated subcarrier wave relatively to its central frequencies, said further filter having an input coupled to said output of said amplitude modulator, and an output; the output of said further filter being coupled to said second input of said amplitude modulator by a feedback path, said feedback path being a negative feedback path consisting essentially of an envelope detector.

12. A coulour television transmitter as claimed in claim 11, wherein a low-pass filter is inserted between said envelope detector and said modulation input of said amplitude modulator.

13. A colour television receiver for receiving the complex video signal transmitted by a colour television transmitter as claimed in claim 2, said complex video signal comprising a first wide-band picture signal, and at least one subcarrier wave which is frequency modulated by another picture signal, said receiver comprising filtering means, having an output, for supplying said frequency-modulated subcarrier wave; a first filter for reinforcing the central frequencies of said subcarrier wave relatively to its lateral frequencies, said first filter having a gain vs. frequency characteristic which is the reverse of that said further filter of said transmitter; amplitude limiting means and frequency discriminating means for frequency demodulating the output signal of said first filter; and a filter reinforcing the lower frequencies of the signal supplied by said frequency-demodulating means relatively to its higher frequencies, said last mentioned filter having a gain vs. frequency characteristic which is the reverse of that of said pre-emphasis filter of said transmitter.

14. A colour television receiver for receiving the complex video signal transmitted by a colour television transmitter as claimed in claim 2, said complex video signal comprising a first wide-band picture signal, and at least one subcarrier wave which is frequency modulated by another picture signal and amplitude-modulated by an auxiliary signal, said receiver comprising filtering means, having an output, for supplying said frequency-modulated subcarrier wave; a first filter for reinforcing the central frequencies of said subcarrier wave relatively to its lateral frequencies, said first filter having a gain vs. frequency characteristic which is the reverse of that said further filter of said transmitter; amplitude limiting means and frequency discriminating means for frequency demodulating the output signal of said first filter; and a filter reinforcing the lower frequencies of the signal supplied by said frequency-demodulating means relatively to its higher frequencies, said last mentioned filter having a gain vs. frequency characteristic which is the reverse of that of said pre-emphasis filter of said transmitter.

15. A colour television receiver for receiving the complex video signal transmitted by a colour television transmitter as claimed in claim 2, said complex video signal comprising a first wide-band picture signal, and at least one subcarrier wave which is frequency modulated by another picture signal, said other picture signal consisting of two sequential colour signals alternating at the line frequency, said receiver comprising filtering means, having an output, for supplying said frequency-modulated subcarrier wave; a first filter for reinforcing the central frequencies of said subcarrier wave relatively to its lateral frequencies, said first filter having a gain vs. frequency characteristic which is the reverse of that said further filter of said transmitter; a first and a second channel having respective inputs coupled to said first filter, and respective outputs, said second channel comprising delay means imparting a delay equal to the reciprocal of the line frequency; a double switch comprising two inputs respectively coupled to the outputs of said direct and delayed channels, and two outputs to one of which said subcarrier is directed by said switch when it is modulated by the first of said two sequential signals, and to the other of which said subcarrier is directed by said switch when it is modulated by the second of said sequential colour signals, each of the outputs of said switch feeding a series circuit comprising a limiter, a frequency discriminator and a de-emphasis filter, said last mentioned filter having a gain vs. frequency characteristic which is the reverse of that of said pre-emphasis filter of said transmitter.

References Cited

UNITED STATES PATENTS

| | | | |
|---|---|---|---|
| 2,285,085 | 6/1942 | Hagen | 325—65 |
| 2,986,597 | 5/1961 | Teer | 178—5.2 |
| 3,069,679 | 12/1962 | Sweeney et al. | 325—36 |
| 3,213,191 | 10/1965 | De France et al. | 178—5.4 |
| 3,213,367 | 10/1965 | Ravenscroft | 325—45 |
| 3,213,368 | 10/1965 | Geluk | 332—19 |
| 3,162,838 | 12/1964 | Sauvanet | 178—5.4 X |

ROBERT L. GRIFFIN, *Acting Primary Examiner.*

DAVID G. REDINBAUGH, *Examiner.*

J. A. O'BRIEN, R. MURRAY, *Assistant Examiners.*